Nov. 6, 1962  L. R. HULLS  3,062,078
MATERIAL THICKNESS CONTROL APPARATUS
Filed Sept. 17, 1958
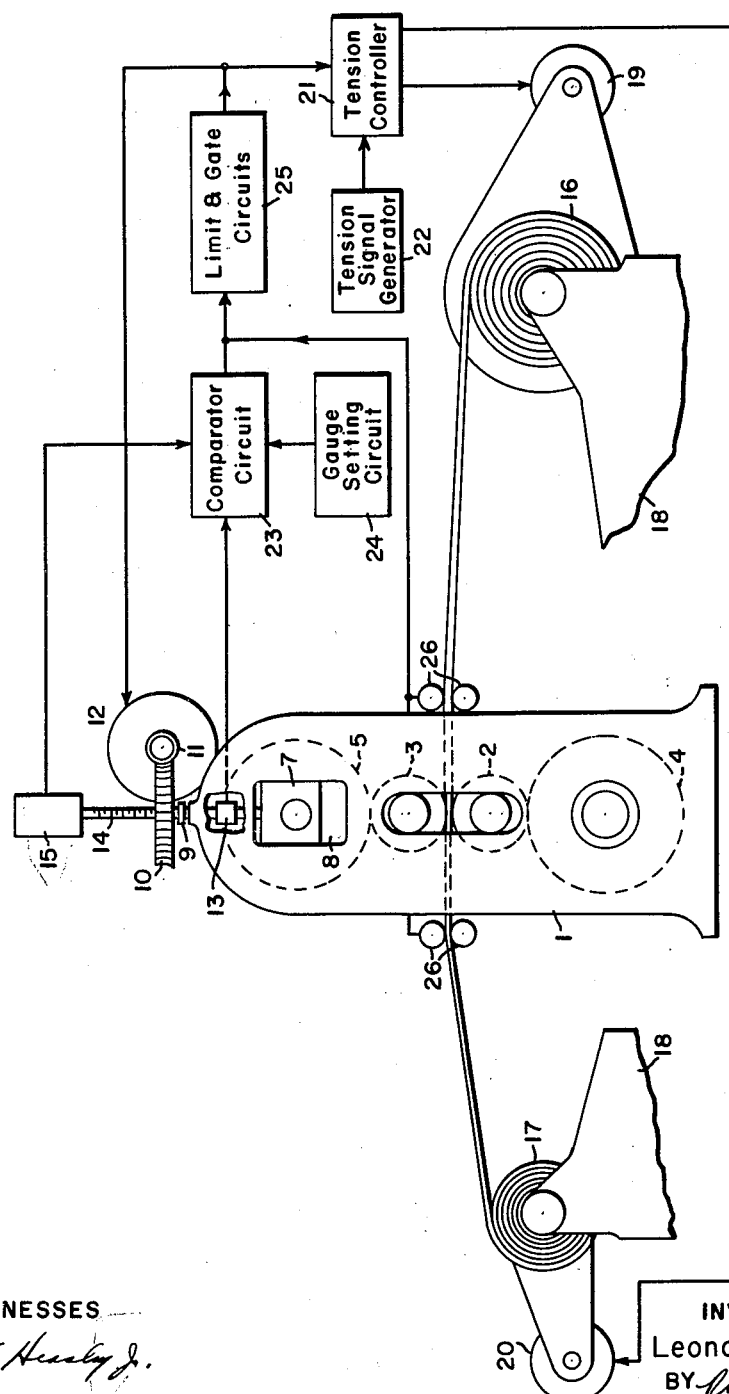
WITNESSES
John E. Healey Jr.
Leon M. Garman
INVENTOR
Leonard R. Hulls
BY R. J. Brodahl
ATTORNEY United States Patent Office 3,062,078
Patented Nov. 6, 1962

3,062,078
MATERIAL THICKNESS CONTROL APPARATUS
Leonard R. Hulls, Dundas, Ontario, Canada, assignor to Canadian Westinghouse Company, Limited, Hamilton, Ontario, Canada
Filed Sept. 17, 1958, Ser. No. 761,495
Claims priority, application Canada Oct. 16, 1957
5 Claims. (Cl. 80—56)

This invention relates to apparatus for reducing the thickness of material, such as metal strip, by passing the material through a thickness reducing member, such as a pair of opposed rolls or a die, and relates particularly to such apparatus which can be operated so as to obtain a more uniform thickness of the reduced material than has been possible hitherto.

A specific example of such apparatus is a cold rolling mill. The material entering the mill may vary in thickness and other properties along its length, and as a result, unless compensation is made for these variations of the incoming material, the out-going material will also vary in thickness. In one method of correction that has been used hitherto, the thickness of the outgoing material has been measured continuously, for example by means of a flying micrometer, and the mill operator has continuously adjusted either the spacing of the mill rolls, or the tension on the material being rolled, so as to maintain as constant as possible the thickness of the outgoing material, as indicated by the micrometer.

With the increasing speed of mills however, it becomes more and more necessary to eliminate the relatively long time delay incurred by the operator taking time to reach a decision to take action. In order to do this, it has been proposed in the past to measure the output thickness and use this measurement to control the mill. If the measuring means are disposed beyond the actual point of contact of the rolls and the material, it is evident that there will be a certain time delay between the production of a certain thickness of material by the mill and the measurement and subsequent indication of the particular thickness. This time delay depends upon the speed of the material and in a fast operating mill will result in the production of a large quantity of material of incorrect thickness.

A solution that has been proposed in Canadian Patent 491,836 to W. C. F. Hessenberg and R. B. Sims, makes use of the fact that a mill obeys Hooke's law, and therefore, during operation of the mill the spacing between the rolls is equal to the initial spacing between the rolls when unloaded plus an amount proportional to the strain of the mill, the strain being proportional to the elastic coefficient of the mill times the load forcing the rolls apart. In the system described in the above mentioned patent a compound electric signal is produced by adding a signal representing the no load position of the rolls to a signal representing the correct proportion of the total strain between the rolls. This compound signal is compared to a further signal which represents the desired thickness of the material, the difference between the two signals giving an error signal representing the amount by which the actual output thickness of the material differs from the desired output thickness, and this error signal is used to control the tension of the material passing through the rolls.

It has also been proposed in Canadian Patent No. 526,491 to W. C. F. Hessenberg and R. B. Sims, to control the spacing between the rolls of a rolling mill, or the dies of a die stand, in accordance with the value of an error signal in order to maintain constant the output thickness of the mill or die stand respectively. The control of output thickness by adjustment of tension alone has not been found entirely satisfactory since in some circumstances it is possible for the tension to increase sufficiently to break the strip, or alternatively for the tension to decrease to such an extent that the coiling of the reduced material will not be performed properly. Moreover, it has been found that with thicker gauges of metal strip (e.g. steel strip of 0.08–0.1 inch thickness) the adjustment of tension has little or no effect in controlling the output thickness of the strip.

The control of output thickness by adjustment of the roll or die spacing alone also is not entirely satisfactory, since the control mechanism that must be employed is of massive construction and therefore is relatively slow acting and is subjected to heavy wear if forced to operate continuously. Moreover, it has been found that with the thinner gauges of metal strip (e.g. steel strip of 0.015–0.020 inch thickness) the adjustment of roll or die spacing has little or no effect in controlling the output thickness of the strip.

In accordance with this invention the disadvantages of these two previously proposed methods of control are avoided by proving in apparatus for reducing the thickness of material, a thickness reducing member having opposed material engaging surfaces between which a separating force is established by the material passing through the member, means for passing the material to be reduced in thickness under tension through the thickness reducing member, means for producing a first electric signal representative of the separation setting of the said opposed material engaging surfaces, means for producing a second electric signal representative of the said separating force, means for combining the said first and second electric signals to produce an electric error signal, means for adjusting the magnitude of said tension within predetermined limits in response to the said electric error signal, and means for adjusting the separation setting of the said opposed material engaging surfaces in response to the electric error signal.

In practice, in an inherently stable system incorporating both controls, it is found that owing to the natural characteristics of each control there is an automatic selection of their mode of operation to produce the desired thickness control. Thus of the two controls the tension control is far more rapidly adjustable since smaller inertias are involved than in the spacing control, and if only a small correction is required, then the quicker acting tension control will generally be able to effect the necessary correction before the slower acting spacing control has had an opportunity to become operative. A limit must be placed on the values of tension that can be produced by the control for the reasons given above, and if after the tension control has varied the maximum amount permitted and the material is still not of correct thickness, then the spacing control has time to begin to function and continues to operate until the correct thickness is once more established.

If both controls have been effective then in practice, it is preferred to maintain the spacing control operative for a longer period than is necessary only to produce the required correction, the "over-correction" thus produced by the spacing control being compensated by the tension control. Such an arrangement ensures that when an immediately succeeding correction is required in the same sense the tension control is not already at the respective limit of its operation, so that both controls can be effective and not the slower-acting spacing control alone.

While a rapid response is necessary in the tension control it should be appreciated that an indefinite decrease in the response time of this system is not to be desired, and in fact a continued decrease in the response time may cause greater variations in output thickness than if no such control existed. This may be explained as follows:

The material contacting rolls or back-up rolls of the mill may be somewhat eccentric, this eccentricity producing a variation of spacing between the material-contacting rolls which is not indicated in the control system. Due to the stiffness of the mill, this eccentricity is largely absorbed. For example, in a case in which the eccentricity is in the neighborhood of two-thousandths of an inch, then the total effect on the rolled material, assuming a constant thickness and other characteristics of the incoming material, will result in only two-tenths of a thousandth of an inch variation in the output thickness of the material. The eccentricity will cause a continual alternation of the strain in the mill at the frequency of rotation of the eccentric roll, which in turn will cause continual fluctuation at the same frequency of the error signal which is fed to the tension control. If the tension control operates too rapidly this error signal will cause a continual fluctuation of the tension that in turn will cause the output thickness of the strip to vary in thickness exactly in correspondence with the eccentricity of the roll.

It is therefore an object of this invention to provide apparatus for reducing the thickness of material with which the output thickness is maintained at the desired value and which utilizes to that end control of both the spacing of the rolls or dies and the tension of the material passing through the apparatus.

This and other objects of my invention are attained as will be appreciated from the following description taken together with the drawing in which the single FIGURE shows a schematic diagram of the control system, associated with a schematic representation of the physical aspect of a rolling mill in side elevation.

There is illustrated in the drawing a reversing rolling mill comprising a mill frame 1 in which are rotatably mounted a pair of opposed rolls 2 and 3 and a cooperating pair of back-up rolls 4 and 5, a strip 6 of material that is to be reduced in thickness being passed between the opposed material engaging surfaces of the rolls 2 and 3. The upper back-up roll 5 is mounted for rotation by plummer blocks 7 (only one shown) the blocks being mounted in turn for vertical sliding movement in respective slots 8 in the frame 1. The positions of these blocks 7, and thus the spacing of the rolls 2 and 3, are established by screws 9 (only one shown) the screws 9 passing through corresponding screw threaded bores in the frame 1, so that rotation of a respective pinion 10 mounted on the upper end of the screw causes it to move vertically through the frame. Rotation of each pinion 10 is effected by rotation of a respective worm gear 11 mounted on the shaft of a respective motor 12. A strain gauge 13 is interposed between the end of each screw 9 and its point of contact with the respective block 7, the gauge measuring the force of the respective screw on its block due to the separating force between the rolls 2 and 3 and hence the stress on the frame 1, which in turn according to Hooke's law determines the strain of the frame. An extension shaft 14 is mounted on the upper surface of the pinion 10 and drives a positional generator 15 which produces an electrical signal representative of the rotational position of pinion 9, and hence representative of the separation setting of the rolls 2 and 3 with no load thereon.

The incoming strip 6 is fed from a coil 16 and through the rolls 2 and 3, the outgoing strip of reduced thickness being wound into another coil 17. The coils are mounted in a suitable supporting structure 18 (only a portion of which is shown), the structure supporting the coils at the appropriate distances from the mill and in the required spatial relation to the rolls of the mill. The reel 16 is mechanically coupled to an electric motor 19, while the reel 17 is mechanically coupled to an electric motor 20, the construction of the motors being such that the motor coupled to the reel from which strip is being unwound (the motor 19 in the embodiment shown) can be operated as a drag generator. The two motors are capable of control so as to adjust the tensions on the ingoing and the outgoing sides of the strip, so that the overall tension in the strip is maintained at the required value between limits which ensure that it will be coiled neatly and tightly without danger of breaking. The control for the motors 19 and 20 is indicated in the drawing as tension controller 21 which is in turn partly controlled by a tension signal generator 22 that is capable of manual setting by the mill operator, to select the range of tension required for the gauge of strip that is passing through the mill.

The electric signal derived from the strain gauge 13 is added to the signal from the position generator 15 in a comparator and amplifier circuit 23, the circuit adding the signals in the proportions required to produce a signal representative of the actual spacing between the rolls 2 and 3 during operation of the mill. A schematic showing of such a comparator is shown on page 14 of the book Electronic Analog Computers by G. A. Korn and T. Korn, McGraw-Hill Book Co. (1952). A further electric signal representative of the desired thickness is produced in the gauge setting circuit 24, which can be adjusted manually by the mill operator. The electric signal from the gauge setting circuit 24 is also fed to the circuit 23 and an electric error signal which is a resultant of the three signals fed to the circuit 23 is applied through a circuit 25 to the tension controller 21 and the screw motor 12, the circuit 25 comprising a manually adjustable limiting circuit and also a manually adjustable gate circuit whose functions will be described below.

The operation of the system is as follows:

The mill operator sets the gauge signal generator 24 to the gauge desired for the reduced strip, and also sets the tension signal generator 22 to give the proper tension as dictated by his experience for the material to be rolled and for the particular gauge to be rolled. It may be noted that as a general rule, with a relatively thick strip a change in roll spacing is most effective in controlling the thickness of the strip, while a change in tension has comparatively little effect. As the thickness of the strip decreases the effect of changing roll spacing decreases and the effect of changing tension increases until with relatively thin strips a change in tension is more effective than a change in roll spacing. Moreover, it may be noted that where the strip is to be subjected to a number of passes through the mill, there is no need for such close control of the output thickness during the initial passes as during the final passes. Accordingly, during the initial passes the operator sets the adjustable gate in the circuit 25 so that no correction is attempted until the thickness is in error by more than an amount set by the gate. Also during the initial passes the adjustable limiting circuit can be set so that the error signal is effective to cause operation simultaneously of both the tension control 21 and the screw motor 12. The mill then put in motion.

If the combined electric signals from the strain gauge and the positional generator do not correspond to the selected signal from the gauge signal generator 24, then the error signal is produced and is applied to cause operation of the tension control and the screw motor. The tension control is operative relatively quickly but the change in tension is limited for the reasons described above, and has relatively little effect in correcting the output thickness of the strip. The tension controller 21 might be one such as shown in U.S. Patent 2,586,412 to A. J. Winchester, Jr. The tension signal generator 22 would be the potentiometer 66 controlling the pattern winding 53 of the regulating generator 48. The tension signal supplied from the limit and gate circuits 25 would be applied to an additional winding of the regulating generator 45 of the Winchester patent. The spacing control is operative relatively slowly since the motor armatures, the screws and the rolls are masses of high inertia that must be moved, but once in operation it is very effective in correcting the output thickness of the strip. As the output thickness is corrected the error signal is reduced until it is no longer effective.

As the thickness of the strip is reduced the mill operator resets the adjustable gate of circuit 25 so that thickness is corrected for a smaller error thereof until, during the final passes of the strip, the system is correcting the strip thickness to the final desired limit. Moreover, as the thickness of the strip is reduced the adjustable limiting circuit in the circuit 25 is set so that the error signal is first effective to cause operation of the tension control and thereafter, if the error signal persists after the maximum tension control correction has been applied, is effective to cause operation of the spacing control. Such an arrangement has the advantage that unnecessary operation of the screw motor 12 is avoided at a time where such operation is in any case relatively ineffective to produce the required correction.

As described above, it is necessary that the tension control should not have an excessively high rate of operation in view of the possible eccentricity of one or more of the rolls, and in practice its minimum time for it to come into operation must not be less than the time for a single rotation of the eccentric roll, or the smaller of the eccentric rolls. Fortunately, at very low speeds the tension control is not so effective in producing changes in thickness and, therefore, at very low speeds the said minimum time of the tension control can in some circumstances be smaller than the single rotation time of the eccentric roll without adverse effect.

An additional gauge monitor is provided on the output side of the mill in order to check the correct operation of the control system and also to give indication of any permanent changes in output gauge deviation due, for example, to temperature changes, or aging and malfunction of the system components. In the embodiment illustrated by the drawing this gauge monitor is shown as a flying micrometer constituted by two rolls 26, but any other gauge such as a radiation gauge can also be used. Since the mill illustrated is a reversing mill two gauge monitors 26 are required, one on each side of the mill. If desired the monitor gauge can be arranged to provide an electric signal representative of the output gauge deviation of the rolled strip and this signal can be fed to the circuit 25 and added algebraically to correct the error signal that is fed to the tension and spacing controls.

While my invention has been described in connection with a specific apparatus it should be understood that it may be applied to other apparatus and various equivalents may be employed without departing from the scope of my invention.

I claim as my invention:

1. In control apparatus for reducing the thickness of material and operative with a thickness reducing member having opposed material engaging surfaces between which a separating force is established by the material passing through the member and material passing means for passing the material to be reduced in thickness under tension through the thickness reducing member, the combination with first signal means for producing a first electric signal representative of the separation setting of the said opposed material engaging surfaces, second signal means for producing a second electrical signal representative of the said separating force, third signal means for producing a third electric signal representative of a desired output thickness of material from the apparatus, signal combining means for combining the said first, second and third electric signals to produce an electric error signal, tension adjusting means for adjusting the magnitude of the said tension within predetermined limits in response to the said electric error signal, and separation setting adjusting means for adjusting the separation setting of the said opposed material engaging surfaces in response to the electric error signal, and an adjustable gate circuit through which said electric error signal is simultaneously applied to the tension adjusting means and the separation setting adjusting means, with the adjustable gate circuit preventing operation of at least one of the two last mentioned means in response to the error signal until the error signal has a predetermined value determined by the adjustable gate circuit.

2. In control apparatus for reducing the thickness of material and operative with a thickness reducing member having opposed material engaging surfaces between which a separating force is established by the material passing through the member and material passing means for passing the material to be reduced in thickness under tension through the thickness reducing member, the combination with first signal means for producing a first electric signal representative of the separation setting of the said opposed material engaging surfaces, second signal means for producing a second electric signal representative of the said separating force, third signal means for producing a third electric signal representative of a desired output thickness of material from the apparatus, signal combining means for combining the said first, second and third electric signals to produce an electric error signal, tension adjusting means for adjusting the magnitude of the said tension within predetermined limits in response to the said electric error signal, and separation setting adjusting means for adjusting the separation setting of the said opposed material engaging surfaces in response to the said electric error signal, an output material thickness gauge monitor device producing an electric signal, and control means for applying the last mentioned signal to correct said electric error signal for permanent changes in the output gauge of the reduced material.

3. In control apparatus for reducing the thickness of material and operative with a thickness reducing member having opposed material engaging surfaces between which a separating force is established by the material passing through the member and material passing means for passing the material to be reduced in thickness under tension through the thickness reducing member, the combination with first signal means for producing a first electric signal representative of the separation setting of the said opposed material engaging surfaces, second signal means for producing a second electric signal representative of the said separating force, third signal means for producing a third electric signal representative of a desired output thickness of material from the apparatus, signal combining means for combining the said first second and third electric signals to produce an electric error signal, tension adjusting means for adjusting the magnitude of the said tension within predetermined limits in response to the said electric error signal, and separation setting adjusting means for adjusting the separation setting of the said opposed material engaging surfaces in response to the said electric error signal, and an adjustable gate circuit through which said electric error signal is applied to the tension adjusting means and the separation setting adjusting means, with the adjustable gate circuit being operative to prevent operation of at least one of the two last mentioned means in response to the error signal until the error signal has a value determined by the adjustable gate circuit, an output material thickness gauge monitor device producing an electric signal, and control means for applying the last-mentioned electric signal to correct the said electric error signal for permanent changes in the output gauge of the reduced material.

4. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with first signal means for producing a first electric signal representative of the separation setting of the said opposed material engaging surfaces, second signal means for producing a second electric signal representative of the said separating force, third signal means for producing a third electric signal representative of a desired output thickness of material from the apparatus, signal combining means for combining the said first, second and third electric signals to produce an electric error signal, and tension adjusting means for adjusting the magnitude of the said tension within predetermined limits about a mean value in response to the said electric error signal, separation setting adjusting means for adjusting the separation setting of the said opposed material engaging surfaces in response to the said electric error signal, and control means for manually adjusting the said mean value of the tension magnitude.

5. In control apparatus for reducing the thickness of material and operative with a thickness reducing member having opposed material engaging surfaces between which a separating force is established by the material passing through the member and means for passing the material to be reduced in thickness under tension through the thickness reducing member, the combination with first signal means for producing a first electric signal representive of the separation setting of the said opposed material engaging surfaces, second signal means for producing a second electric signal representative of the said separating force, third signal means for producing a third electric signal representative of a desired output thickness of material from the apparatus, signal combining means for combining the said first, second and third electric signals to produce an electric error signal, tension adjusting means for adjusting the magnitude of said tension within predetermined limits in response to said electric error signal, and separation setting adjusting means for adjusting the separation setting of the said opposed material engaging surfaces in response to the said electric error signal plus a predetermined amount which is slightly greater than that represented by the said error signal, but which amount is not so great that it cannot be corrected by adjustment of the tension within the said predetermined limits.

References Cited in the file of this patent

UNITED STATES PATENTS

| | | |
|---|---|---|
| 2,264,096 | Mohler | Nov. 25, 1941 |
| 2,323,818 | Lessmann | July 6, 1943 |
| 2,659,154 | Rendel | Nov. 17, 1953 |
| 2,735,051 | Gille | Feb. 14, 1956 |
| 2,851,911 | Hessenberg | Sept. 16, 1958 |
| 2,866,145 | Peaslee et al. | Dec. 23, 1958 |
| 2,909,717 | Hulls et al. | Oct. 20, 1959 |

OTHER REFERENCES

Control Engineering, October 1957, pp. 74–81.